(12) United States Patent
Jeong et al.

(10) Patent No.: US 11,903,080 B2
(45) Date of Patent: Feb. 13, 2024

(54) METHOD AND APPARATUS FOR DISCONTINUOUS RECEPTION OPERATIONS OF SIDELINK GROUPCAST/BROADCAST

(71) Applicant: Samsung Electronics Co., Ltd., Suwon-si (KR)

(72) Inventors: Kyeongin Jeong, Allen, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 17/374,970

(22) Filed: Jul. 13, 2021

(65) Prior Publication Data

US 2022/0030661 A1    Jan. 27, 2022

Related U.S. Application Data

(60) Provisional application No. 63/104,469, filed on Oct. 22, 2020, provisional application No. 63/057,855, filed on Jul. 28, 2020, provisional application No. 63/056,218, filed on Jul. 24, 2020.

(51) Int. Cl.
   *H04W 76/28* (2018.01)
   *H04W 72/20* (2023.01)

(52) U.S. Cl.
   CPC .......... *H04W 76/28* (2018.02); *H04W 72/20* (2023.01)

(58) Field of Classification Search
   CPC ...... H04W 76/28; H04W 72/20; H04W 72/30
   See application file for complete search history.

(56) References Cited

U.S. PATENT DOCUMENTS

| | | | |
|---|---|---|---|
| 2016/0044634 A1 | 2/2016 | Seo et al. | |
| 2017/0041875 A1 | 2/2017 | Lu et al. | |
| 2019/0053305 A1 | 2/2019 | Saiwai et al. | |
| 2019/0174411 A1 | 6/2019 | Xu et al. | |

(Continued)

FOREIGN PATENT DOCUMENTS

| | | | |
|---|---|---|---|
| EP | 3499975 A1 | 6/2019 | |
| WO | 2018064477 A1 | 4/2018 | |
| WO | 2020033704 A1 | 2/2020 | |

OTHER PUBLICATIONS

3GPP TSG-RAN WG2 Meeting #109-bis electronic; R2-20xxxxx (R2-2003556), Title: Draft CR on TS 38.321 on the remaining MAC Open issues for 5G V2X with NR SL, Source to WG: Huawei, HiSilicon, Apr. 20-30, 2020 (Year: 2020).*

(Continued)

*Primary Examiner* — Mohammed S Chowdhury

(57) ABSTRACT

Methods and apparatuses in a wireless communication system. A method of operating a first UE includes: determining whether to initiate a SL DRX operation for a SL groupcast/broadcast operation; identifying at least one of a SL DRX cycle length, a SL DRX start offset, and SL DRX timers for the SL groupcast/broadcast operation; identifying, based on at least one of a destination ID and the SL DRX start offset, a time instance in which a SL DRX cycle starts, wherein the time instance comprises at least one of a slot, a subframe, and a frame; and receiving, from a second UE belongs to the destination ID, a PSCCH and a PSSCH based on the at least one of the SL DRX cycle length, the SL DRX start offset, the destination ID, and the SL DRX timers.

20 Claims, 12 Drawing Sheets

(56) References Cited

U.S. PATENT DOCUMENTS

| | | | |
|---|---|---|---|
| 2020/0236656 A1 | 7/2020 | Cao et al. | |
| 2022/0022279 A1* | 1/2022 | Kim | H04W 72/23 |
| 2022/0346011 A1* | 10/2022 | Hong | H04W 52/02 |
| 2022/0353815 A1* | 11/2022 | Lin | H04W 52/0232 |
| 2023/0014303 A1* | 1/2023 | Di Girolamo | H04W 76/28 |
| 2023/0024646 A1* | 1/2023 | Park | H04W 4/40 |

OTHER PUBLICATIONS

3GPP TSG-RAN WG2 Meeting #109-bis electronic; R2-20xxxxx (R2-2003555); Source: Huawei, HiSilicon, Title: Discussion on remaining MAC open issues for 5G V2X with NR SL; Apr. 20-30, 2020. (Year: 2020).*

International Search Report and Written Opinion of the International Searching Authority dated Oct. 22, 2021, in connection with International Application No. PCT/KR2021/009557, 6 pages.

"5G; NR; Physical channels and modulation (3GPP TS 38.211 version 16.2.0 Release 16)", ETSI TS 138 211 V16.2.0, Jul. 2020, 136 pages.

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Physical layer measurements (3GPP TS 38.215 version 16.2.0 Release 16)", ETSI TS 138 215 V16.2.0, Jul. 2020, 30 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Link Control (RLC) protocol specification (3GPP TS 38.322 version 16.1.0 Release 16)", ETSI TS 138 322 V16.1.0, Jul. 2020, 36 pages.

"5G; NR; Packet Data Convergence Protocol (PDCP) specification (3GPP TS 38.323 version 16.1.0 Release 16)", ETSI TS 138 323 V16.1.0, Jul. 2020, 43 pages.

"5G; NR; Radio Resource Control (RRC) protocol specification (3GPP TS 38.331 version 16.1.0 Release 16)", ETSI TS 138 331 V16.1.0, Jul. 2020, 886 pages.

"LTE; 5G; Evolved Universal Terrestrial Radio Access (E-UTRA) and NR; Service Data Adaptation Protocol (SDAP) specification (3GPP TS 37.324 version 16.1.0 Release 16)", ETSI TS 137 324 V16.1.0, Sep. 2020, 19 pages.

* cited by examiner

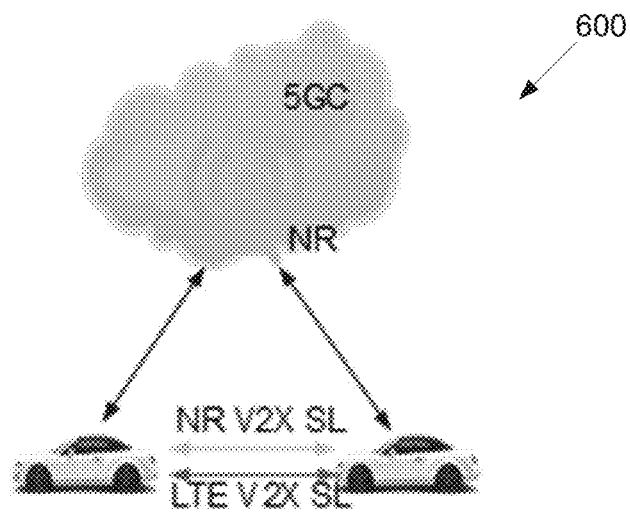
FIG. 6
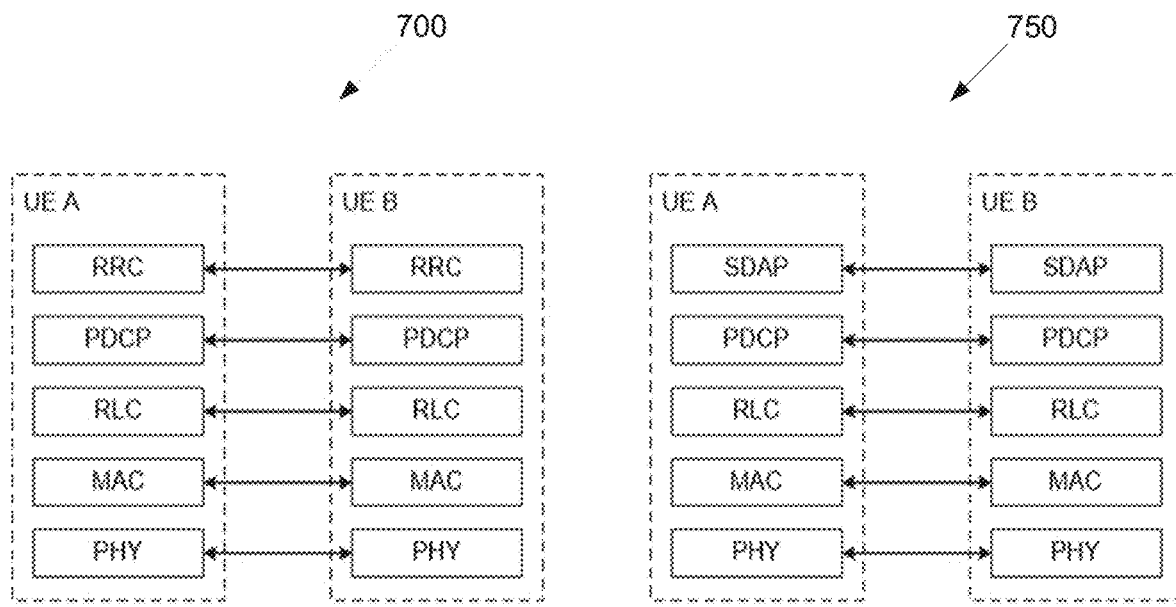
FIG. 7A
FIG. 7B

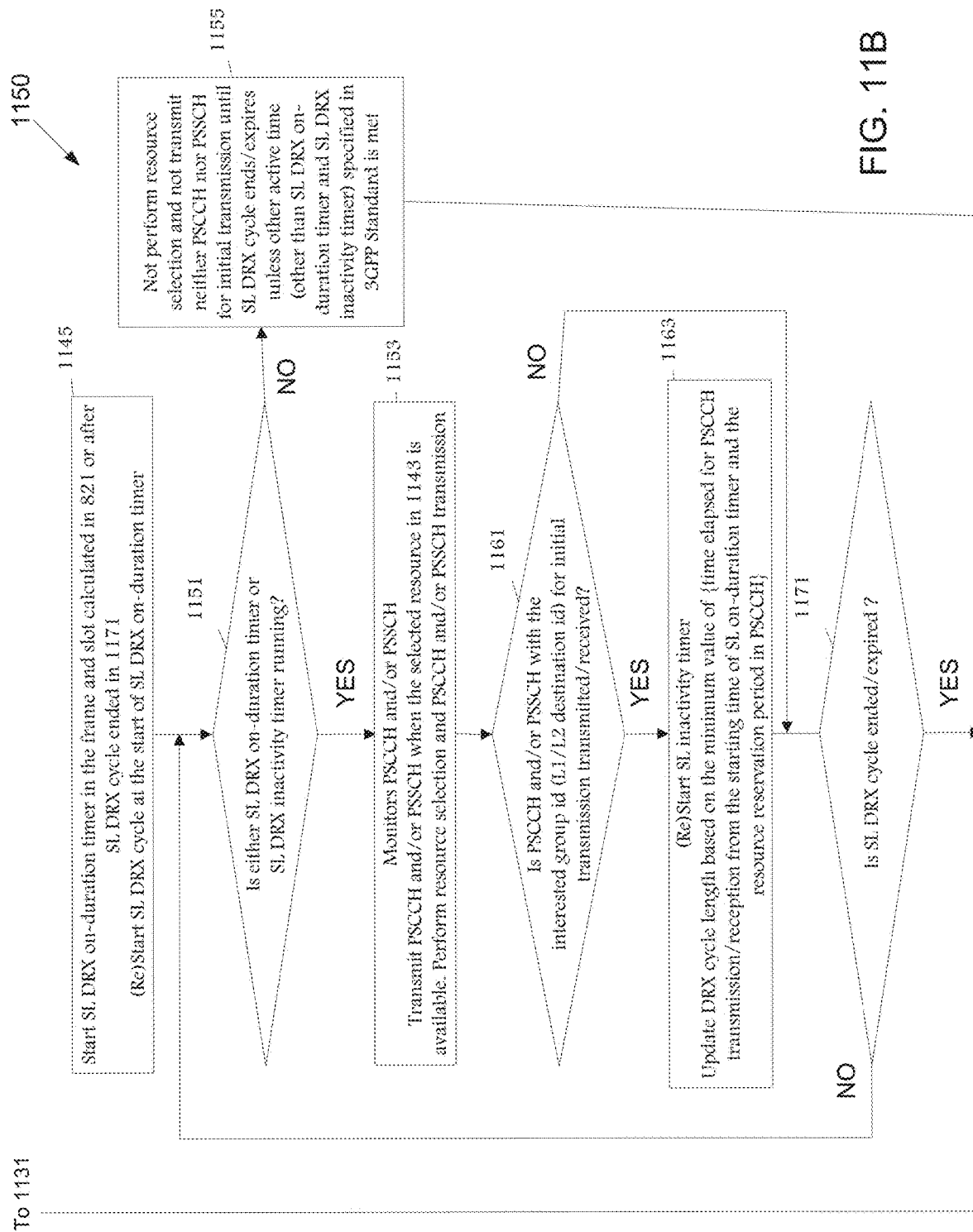

METHOD AND APPARATUS FOR DISCONTINUOUS RECEPTION OPERATIONS OF SIDELINK GROUPCAST/BROADCAST

CROSS-REFERENCE TO RELATED APPLICATIONS AND CLAIM OF PRIORITY

The present application claims priority to:
U.S. Provisional Patent Application No. 63/056,218, filed on Jul. 24, 2020;
U.S. Provisional Patent Application No. 63/057,855, filed on Jul. 28, 2020; and
U.S. Provisional Patent Application No. 63/104,469, filed on Oct. 22, 2020. The content of the above-identified patent document is incorporated herein by reference.

TECHNICAL FIELD

The present disclosure relates generally to wireless communication systems and, more specifically, the present disclosure relates to discontinuous reception operations for sidelink groupcast/broadcast operations in a wireless communication.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to discontinuous receptions for sidelink groupcast/broadcast operations in a wireless communication.

In one embodiment, a first user equipment (UE) in a wireless communication system is provided. The first UE comprises a processor configured to determine whether to initiate a sidelink discontinuous (SL DRX) operation for a SL groupcast/broadcast operation, identify at least one of a SL DRX cycle length, a SL DRX start offset, and SL DRX timers for the SL groupcast/broadcast operation, and identify, based on at least one of a destination identification (ID) and the SL DRX start offset, a time instance in which a SL DRX cycle starts, wherein the time instance comprises at least one of a slot, a subframe, and a frame. The first UE further comprises a transceiver operably connected to the processor, the transceiver configured to receive, from a second UE belongs to the destination ID, a physical sidelink control channel (PSCCH) and a physical sidelink shared channel (PSSCH) based on the at least one of the SL DRX cycle length, the SL DRX start offset, the destination ID, and the SL DRX timers.

In another embodiment, a method of a first UE in a wireless communication system is provided. The method of the first UE comprises determining whether to initiate a SL DRX operation for a SL groupcast/broadcast operation, identifying at least one of a SL DRX cycle length, a SL DRX start offset, and SL DRX timers for the SL groupcast/broadcast operation, identifying, based on at least one of a destination ID and the SL DRX start offset, a time instance in which a SL DRX cycle starts, wherein the time instance comprises at least one of a slot, a subframe, and a frame, and receiving, from a second UE belongs to the destination ID, a PSCCH and a PSSCH based on the at least one of the SL DRX cycle length, the SL DRX start offset, the destination ID, and the SL DRX timers.

In yet another embodiment, a second UE in a wireless communication system is provided. The second UE comprises a processor configured to determine whether to initiate a SL DRX operation for a SL groupcast/broadcast operation, identify at least one of a SL DRX cycle length, a SL DRX start offset, and SL DRX timers for the SL groupcast/broadcast operation, and identify, based on at least one of a destination ID and the SL DRX start offset, a time instance in which a SL DRX cycle starts, wherein the time instance comprises at least one of a slot, a subframe, and a frame. The second UE further comprises a transceiver operably connected to the processor, the transceiver configured to transmit, to a first UE belongs to the destination ID, a PSCCH and a PSSCH based on the at least one of the SL DRX cycle length, the SL DRX start offset, the destination ID, and the SL DRX timers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example V2X communication over sidelink according to embodiments of the present disclosure;

FIG. 7A illustrates an SL control plane radio control (RRC) protocol stack;

FIG. 7B illustrates an SL user plane data radio protocol stack;

FIG. 11B illustrates a flowchart of a method for TX UE behaviors according to embodiments of the present disclosure.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.2.0, "Physical channels and modulation"; 3GPP TS 38.212 v.16.2.0, "Multiplexing and channel coding"; 3GPP TS 38.213 v16.2.0, "NR; Physical Layer Procedures for Control"; 3GPP TS 38.214: v.16.2.0, "Physical layer procedures for data"; 3GPP TS 38.215 v.16.2.0, "Physical layer measurements"; 3GPP TS 38.321 v16.1.0, "Medium Access Control (MAC) protocol specification"; 3GPP TS 38.322 v.16.1.0, "Radio Link Control (RLC) protocol specification"; 3GPP TS 38.323, v.16.1.0, "Packet Data Convergence Protocol (PDCP) specification"; 3GPP TS 38.331, v.16.1.0, "Radio Resource Control (RRC) protocol specification"; and 3GPP TS 37.324 v.16.1.0, "Service Data Adaptation Protocol (SDAP) specification."

Figure 1:
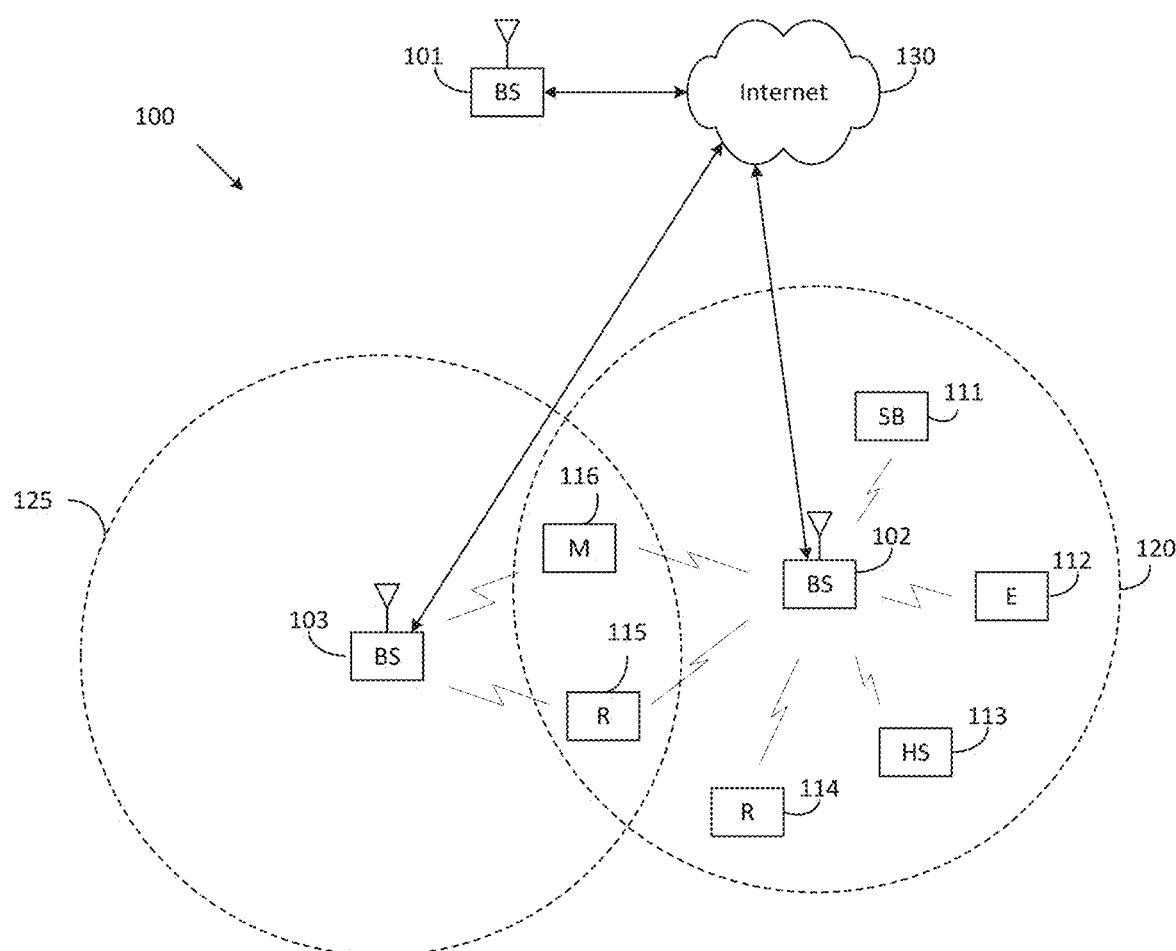
FIG. 1 illustrates an example wireless network according to embodiments of the present disclosure.
Figure 2:
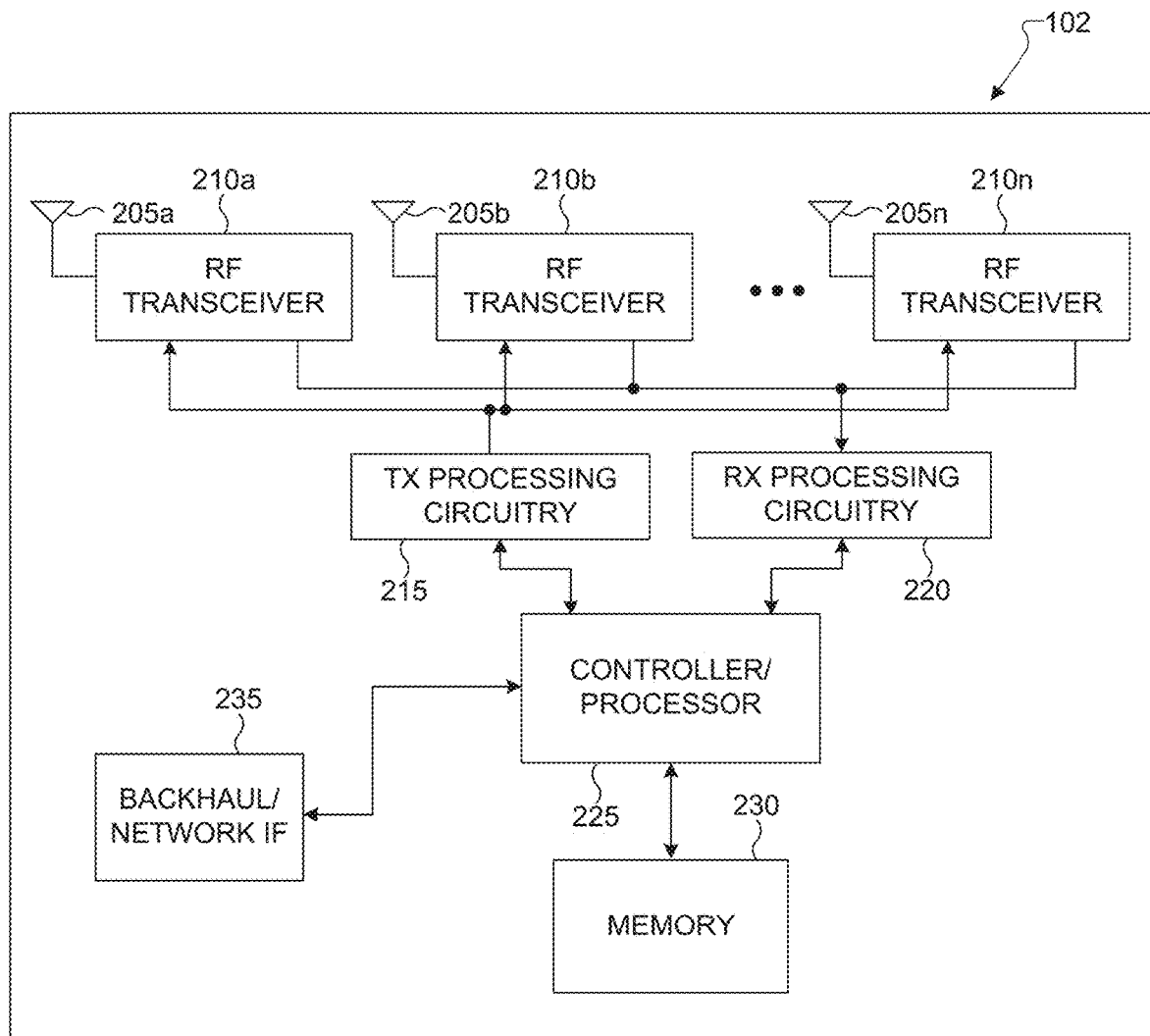
FIG. 2 illustrates an example gNB according to embodiments of the present disclosure.
Figure 3:
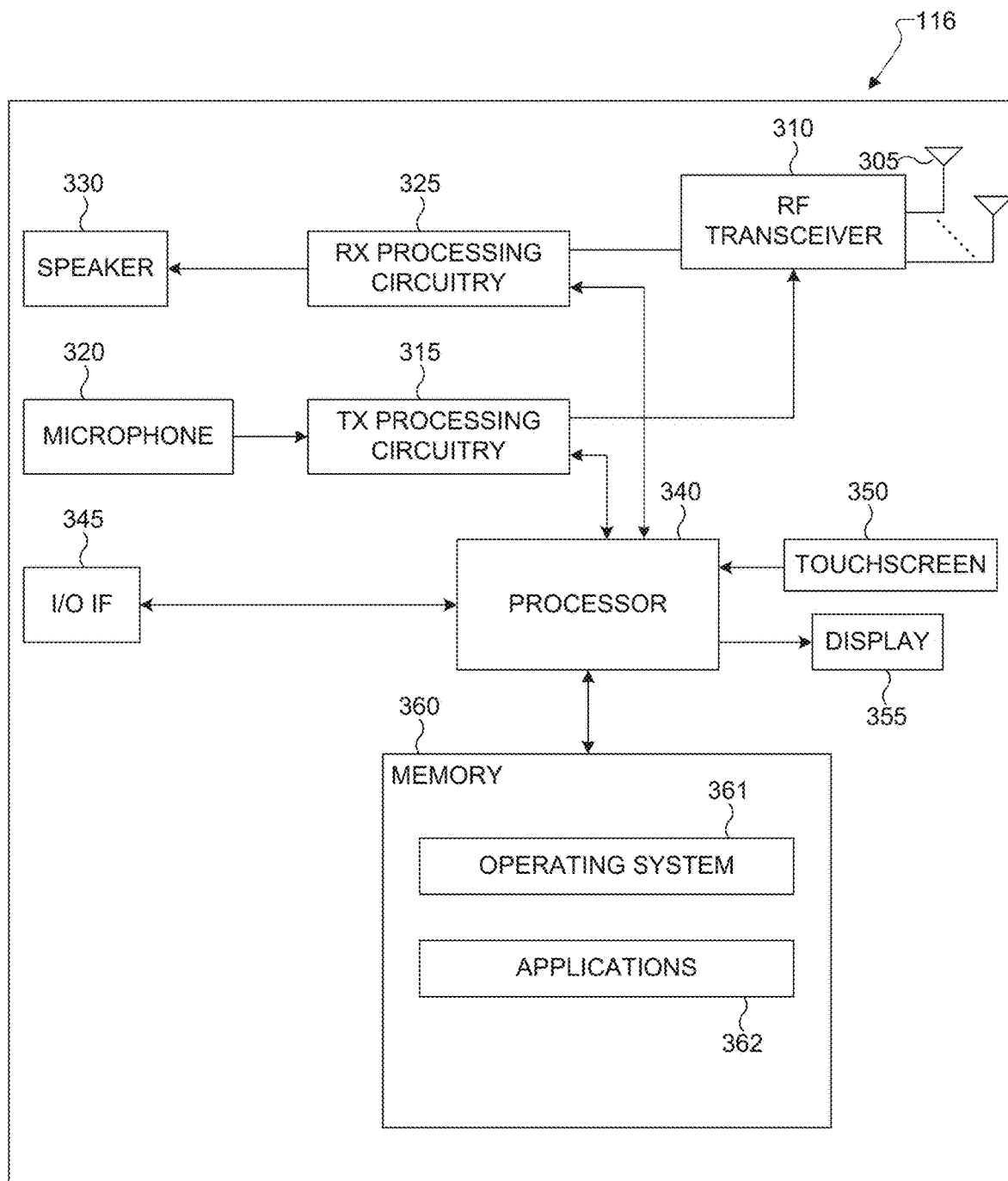
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for UE assistance information report for sidelink communication. In certain embodiments, and one or more of the gNBs 101-103 includes circuitry, programing, or a combination thereof, for beam management and coverage enhancements for sidelink measurements in V2X communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the discontinuous reception for a sidelink groupcast/broadcast operation. As another particular example, while shown as including a single instance of TX processing circuitry 215 and a single instance of RX processing circuitry 220, the gNB 102 could include multiple instances of each (such as one per RF transceiver).

Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a discontinuous reception for a sidelink groupcast/broadcast operation. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
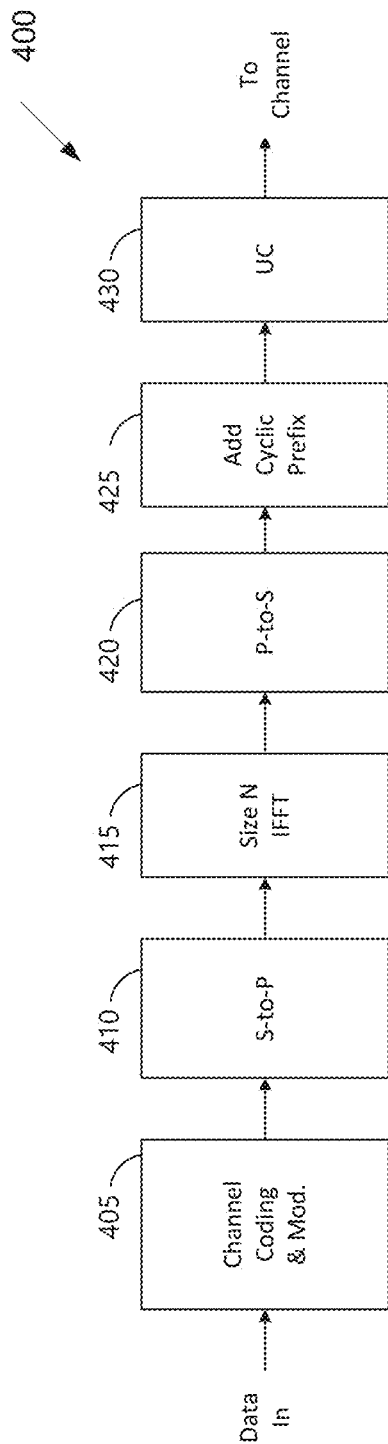
FIGS. 4 and 5 illustrate example wireless transmit and receive paths according to this disclosure.
Figure 5:
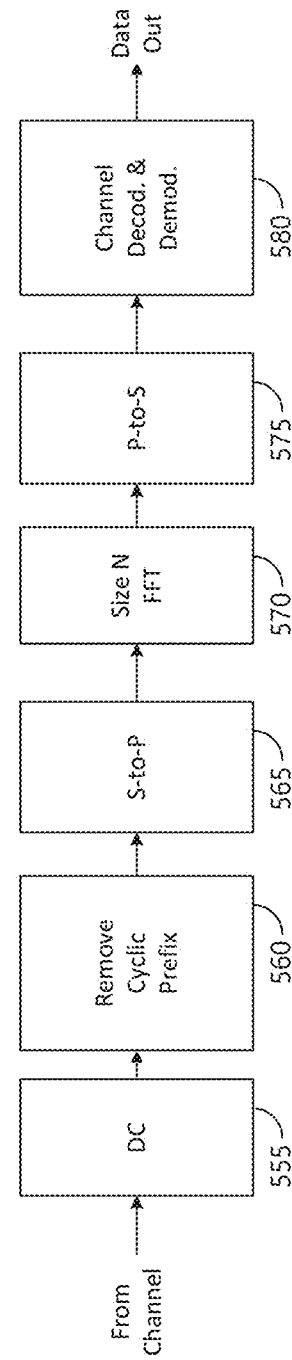

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, NR has been being discussed as a 5G wireless communication. One of NR features under the discussion is V2X.

FIG. 6 illustrate an example V2X communication over sidelink 600 according to embodiments of the present disclosure. An embodiment of the V2X communication over sidelink 600 shown in FIG. 6 is for illustration only.

FIG. 6 illustrates an example scenario of vehicle to vehicle communication. Two or multiple vehicles can transmit and receive data/control over direct link/interface between vehicles. The direct link/interface between vehicles or between vehicle and other things is named as a sidelink (SL) in 3GPP. It is noted that the FIG. 6 describes the scenario where the vehicles still can communicate with a gNB in order to acquire SL resources, SL radio bearer configurations, etc., however it is also possible even without interaction with the gNB, vehicles still communicate each other over the SL. In the case, the SL resources, the SL radio bearer configurations, etc., are preconfigured (e.g., via V2X server or any other core network entity).

In 3GPP wireless standards, NR is discussed as 5G wireless communication. One of NR features under the discussion is vehicle-to-everything (V2X).

FIG. 6 illustrates an example V2X communication over sidelink 600 according to embodiments of the present disclosure. An embodiment of the V2X communication over sidelink 600 shown in FIG. 6 is for illustration only.

FIG. 6 describes the example scenario of vehicle to vehicle communication. Two or multiple vehicles can transmit and receive data/control over direct link/interface between vehicles. The direct link/interface between vehicles or between vehicle and other thing (e.g., pedestrian device or any device related to transportation system) or between other things is named as SL in 3GPP standard.

FIG. 6 describes one example scenario where the vehicles communicate each other and the vehicles are located in in-coverage of NR network. Vehicles communicate with the gNB in order to acquire SL related resource information (e.g., SL resource pool configuration, etc.), SL radio bearer configurations (SL MAC, RLC, PDCP, SDAP, RRC related configurations), etc.

The vehicles transmit/receive the data/control each other over SL once the vehicles acquire SL related configurations from the gNB. It is noted that it is also possible even without interaction with the gNB (e.g., vehicles are located in out-of-coverage of NR network), vehicles still communicate each other over SL. In the case, SL resources, SL radio bearer configuration, etc. are preconfigured (e.g., via V2X server or any other core network entity). For more detailed V2X scenarios and studies are captured in 3GPP standard specification.

For SL communication, the radio interface layer1/layer 2/layer 3 (L1/L2/L3) protocols comprise, as specified in 3GPP standard specification, physical (PHY) protocol, MAC, RLC, PDCP, RRC, and SDAP.

FIG. 7A illustrates an SL control plane radio control (e.g., RRC) protocol stack 700. An embodiment of the SL control plane RRC protocol stack 700 shown in FIG. 7A is for illustration only.

FIG. 7B illustrates an SL user plane data radio protocol stack 750. An embodiment of the SL user plane data radio protocol stack 750 shown in FIG. 7B is for illustration only.

FIGS. 7A and 7B illustrate the example of SL control plane radio protocol stack (for SL-RRC) and SL user plane data radio protocol stack for NR SL communication.

SL control plane radio protocol stack (e.g., RRC) is illustrated in FIG. 7A and SL user plane data radio protocol stack is illustrated in FIG. 7B.

A physical protocol layer handles physical layer signals/channels and physical layer procedures (e.g., physical layer channel structures, physical layer signal encoding/decoding, SL power control procedure, SL CSI related procedure). Main physical SL channels and signals are defined as follow: (1) a sidelink control information (SCI) in PSCCH and/or PSSCH indicates resource and other transmission parameters used by a UE for data PSSCH; (2) a data PSSCH transmits the transport blocks (TBs) of data themselves and CSI feedback information, etc.; (3) a physical sidelink feedback channel (PSFCH) transmits hybrid automatic repeat request (HARD) feedback over the sidelink from a UE which is an intended recipient of a PSSCH transmission to the UE which performed the transmission; (4) a sidelink synchronization signal includes sidelink primary and sidelink secondary synchronization signals (S-PSS, S-SSS); and (5) a physical sidelink broadcast channel (PSBCH) indicates the required essential system information for SL operations.

A MAC protocol layer performs packet filtering (e.g., determine whether the received packet is actually destined to the UE (based on the L2 source and destination ids in the MAC header), SL carrier/resource pool/resource within the resource pool (re)selection, priority handling between SL and UL for a given UE, SL logical channel prioritization, the corresponding packet multiplexing (e.g., multiplexing multiple MAC service data units (SDUs) into a given MAC protocol data unit (PDU)) and SL HARQ retransmissions/receptions.

An RLC protocol layer performs RLC SDU segmentation/SDU reassembly, re-segmentation of RLC SDU segments, error correction through ARQ (only for AM data transfer). PDCP protocol layer performs header compression/decompression, ciphering and/or integrity protection, duplication detection, re-ordering and in-order packet delivery to the upper layer and out-of-order packet delivery to the upper layer.

An RRC protocol layer performs transfer of a SL-RRC message between peer UEs, maintenance and release of SL-RRC connection between two UEs, and detection of SL radio link failure for a SL-RRC connection. SDAP protocol layer performs mapping between a quality of service (QoS) flow and a SL data radio bearer.

SCI on PSCCH and/or PSSCH comprises two SCI formats. 1st stage SCI format is SCI format 1-A in PSCCH and 2nd stage SCI format is SCI format 2-A and/or SCI format 2-B in PSSCH. Each SCI format has the following information.

A SCI format 1-A is used for the scheduling of PSSCH and $2^{nd}$-stage-SCI on PSSCH.

Following information is transmitted by means of the SCI format 1-A: (1) priority—3 bits as defined in 3GPP standard specification; (2) frequency resource assignment—

$$\left\lceil \log_2 \left( \frac{N_{subChannel}^{SL}(N_{subChannel}^{SL}+1)}{2} \right) \right\rceil$$

bits when the value of the higher layer parameter sl-MaxNumPerReserve is configured to 2, otherwise $$\left\lceil \log_2 \left( \frac{N_{subChannel}^{SL}(N_{subChannel}^{SL}+1)(2N_{subChannel}^{SL}+1)}{6} \right) \right\rceil$$

bits when the value of the higher layer parameter sl-MaxNumPerReserve is configured to 3, as defined in 3GPP standard specification; (3) time resource assignment—5 bits when the value of the higher layer parameter sl-MaxNumPerReserve is configured to 2, otherwise, 9 bits when the value of the higher layer parameter sl-MaxNumPerReserve is configured to 3, as defined in 3GPP standard specification; (4) resource reservation period $-\lceil \log_2 N_{rsv\_period} \rceil$ bits as defined in 3GPP standard specification, where $N_{rsv\_period}$ is the number of entries in the higher layer parameter sl-ResourceReservePeriodList, if higher layer parameter sl-MultiReserveResource is configured; 0 bit otherwise; (5) DMRS pattern -$\lceil \log_2 N_{pattern} \rceil$ bits as defined in 3GPP standard specification, where $N_{pattern}$ is the number of DMRS patterns configured by higher layer parameter sl-PSSCH-DMRS-TimePatternList; 0 bit if sl-PSFCH-DMRS-TimePatternList is not configured; (6) $2^{nd}$-stage SCI format—2 bits as shown in TABLE 1; (7) Beta_offset indicator—2 bits as provided by higher layer parameter sl-BetaOffsets2ndSCI and table as shown in TABLE 2; (8) number of DMRS port—1 bit as defined in table as shown in TABLE 3; (9) modulation and coding scheme—5 bits as defined in 3GPP standard specification; (10) additional MCS table indicator—as defined in 3GPP standard specification: 1 bit if one MCS table is configured by higher layer parameter sl-Additional-MCS-Table; 2 bits if two MCS tables are configured by higher layer parameter sl-Additional-MCS-Table; 0 bit otherwise; (11) PSFCH overhead indication—1 bit as defined in 3GPP standard specification, if higher layer parameter sl-PSFCH-Period=2 or 4; 0 bit otherwise; and/or (12) reserved—a number of bits as determined by higher layer parameter sl-NumReserved-Bits, with value set to zero.

TABLE 1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 2

Mapping of Beta_offset indicator values to indexes

| Value of Beta_offset indicator | Beta_offset index |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

TABLE 3

Number of DMRS port(s)

| Value of the Number of DMRS port field | Antenna ports |
|---|---|
| 0 | 1000 |
| 1 | 1000 and 1001 |

An SCI format 2-A in PSSCH is used for the decoding of PSSCH, with a HARQ operation when HARQ-ACK information includes ACK or NACK, or when there is no feedback of HARQ-ACK information.

Following information is transmitted by means of the SCI format 2-A: (1) HARQ process number—$\lceil \log_2 N_{process} \rceil$ bits as defined in 3GPP standard specification; (2) a new data indicator—1 bit as defined in 3GPP standard specification; (3) a redundancy version—2 bits as defined in 3GPP standard specification; (4) a source ID—8 bits as defined in 3GPP standard specification; (5) a destination ID—16 bits as defined in 3GPP standard specification; (6) a HARQ feedback enabled/disabled indicator—1 bit as defined in 3GPP standard specification; (7) a cast type indicator—2 bits as shown in TABLE 4; and/or (8) a CSI request—1 bit as defined in 3GPP standard specification.

TABLE 4

Cast type indicator

| Value of Cast type indicator | Cast type |
|---|---|
| 00 | Broadcast |
| 01 | Groupcast |
| 10 | Unicast |
| 11 | Reserved |

An SCI format 2-B in PSSCH is used for the decoding of PSSCH, with a HARQ operation when HARQ-ACK information includes only NACK, or when there is no feedback of HARQ-ACK information.

The following information is transmitted by means of the SCI format 2-B: (1) a HARQ process number—$\lceil \log_2 N_{process} \rceil$ as defined in 3GPP standard specification; (2) a new data indicator—1 bit as defined in 3GPP standard specification; (3) a redundancy version—2 bits as defined in 3GPP standard specification; (4) a source ID—8 bits as defined in 3GPP standard specification; (5) a destination ID—16 bits as defined in 3GPP standard specification; (6) a HARQ feedback enabled/disabled indicator—1 bit as defined in 3GPP standard specification; (7) a zone ID—12 bits: and/or (8) a communication range requirement as defined in 3GPP standard specification.

Figure 8:
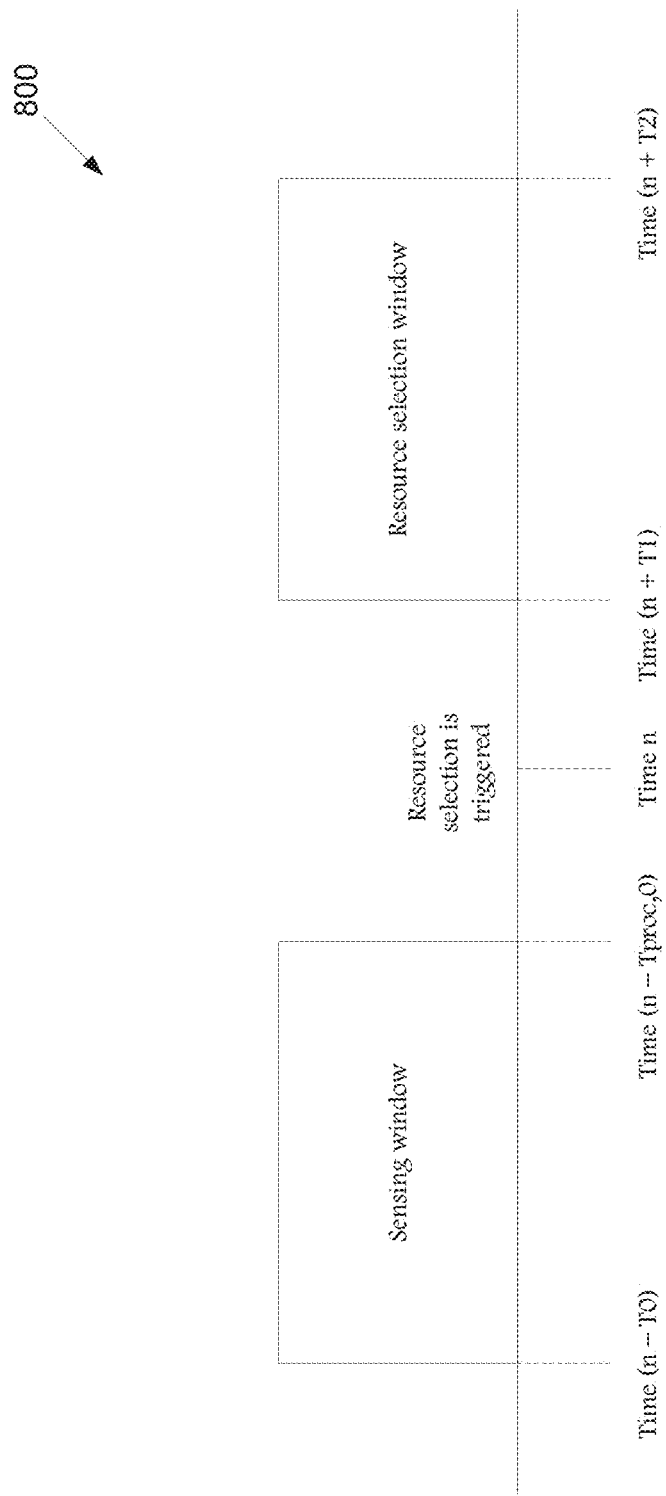
FIG. 8 illustrates an example TX UE's resource (re) selection for transmission according to embodiments of the present disclosure.

FIG. 8 illustrates an example TX UE's resource (re) selection for transmission 800 according to embodiments of the present disclosure. An embodiment of the TX UE's resource (re)selection for transmission 800 shown in FIG. 8 is for illustration only.

As illustrated in FIG. 8, the resource selection has two steps. It may be assumed that a UE triggers resource selection at Time n. First, the UE performs channel sensing during the sensing window in order to find out observed available SL channels. Channel sensing is actually performed in advance than Time n (for example, sensing window is from time (n−T0) to time (n−Tproc,0)). Then during the resource selection window, the UE selects the actual resource(s) for transmission among the observed available SL channels. For example, resource selection window is from time (n+T1) to Time (n+T2).

In 3GPP standard specification, the basic SL communication functionalities are supported and specified. For Rel-17 it is planned to introduce more enhanced features into SL and one of them is to introduce SL DRX (Discontinuous Reception) operation. It is noted that in 3GPP standard specification Rel-16, a UE DRX operation is specified for DL (Downlink) only. Detailed DL DRX operation is specified in 3GPP standard specification (e.g., MAC).

SL groupcast/broadcast communication has new challenges compared to DL DRX (e.g., there is no SL-RRC/PC5-RRC protocol for SL groupcast/broadcast communication while all parameters for DL DRX are configured by dedicated RRC message (e.g., RRC connection reconfiguration), SL groupcast/broadcast is multiple to multiple (M to M) communication while DL/UL communication is basically one to one (1 to 1) communication, etc., a DRX mechanism that is specific to SL groupcast/broadcast is provided here.

Figure 9:
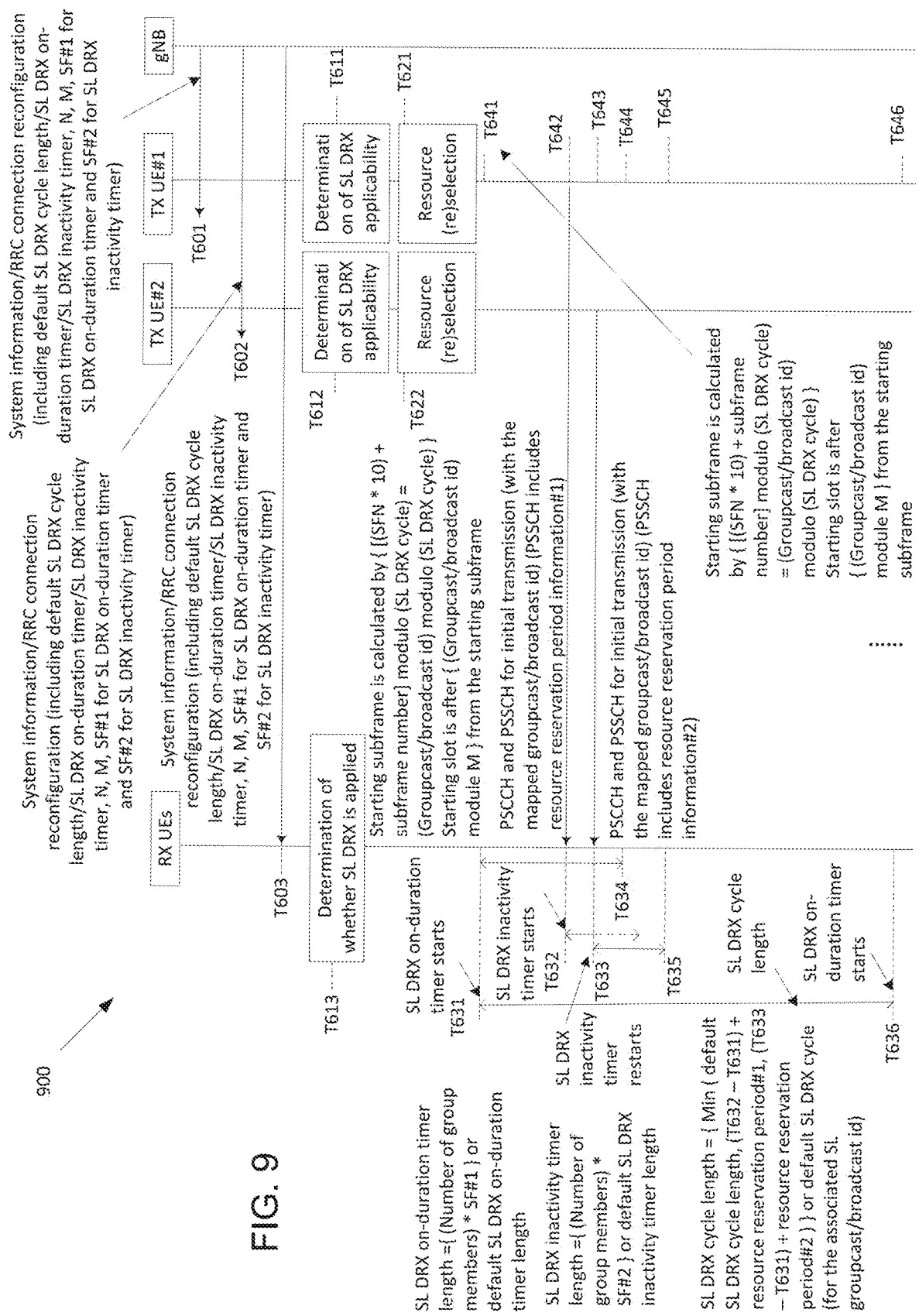
FIG. 9 illustrates a signaling flow of DRX for SL groupcast/broadcast communication according to embodiments of the present disclosure.

FIG. 9 illustrates a signaling flow 900 of DRX for SL groupcast/broadcast communication according to embodiments of the present disclosure. An embodiment of the signaling flow 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a TX UE #1 and a TX UE #2 are the UEs who has data to be transmit so the UEs transmit the corresponding PSCCH and PSSCH over SL. RX UEs are the UEs who receive PSCCH and PSSCH over SL. It is noted that the TX UE #1 and the TX UE #2 can be also RX UEs when the UEs receive others' PSCCH and PSSCH. It is also noted that it is assumed all TX UE #1, TX UE #2 and RX UEs belong to the same SL groupcast/broadcast group. Members in the same SL groupcast/broadcast group share the same group id, which can be expressed by same L2 destination id in the MAC header or L1 destination id in a SCI in PSCCH and/or PSSCH or upper layer (V2X layer or application layer) link id.

As illustrated in FIG. 9, in T601, T602 and T603, a gNB informs all UEs of SL DRX related configurations including default SL DRX cycle length/SL DRX on-duration timer length/SL DRX inactivity timer length, N, M, scaling factor #1 (SF #1) for an SL DRX on-duration timer and/or an SF #2 for SL DRX inactivity timer via system information or an RRC dedicated message (e.g., RRC connection reconfiguration). In another example, list of SF #1 and/or SF #2 can be included and each SF #1 and/or SF #2 can be linked with the number of group member UEs, e.g., the first SF #1 is used when the number of group member UEs is (equal or) less than threshold #1, the second SF #1 is used when the number of group member UEs is more than threshold #1 but (equal or) less than threshold #2, and so forth.

It is also possible all SL DRX related configurations or part of SL DRX related configurations can be preconfigured instead of system information or the RRC dedicated message (e.g., RRC Connection Reconfiguration). In T611, T612, and T613, when the UE receives SL DRX related configurations, the UE determines whether DRX is applied or not to a given groupcast/broadcast group, which the UE is interested in transmission and/or reception. To help the UE, the configuration in T601, T602, and T603 or the pre-configuration can include the information indicating whether SL DRX operation is applied or not per joined groupcast/broadcast group.

Simple example is to include one-bit indication per joined group id (e.g., L1/L2 destination id or upper layer link id). It may be assumed that for UEs' group id (e.g., L1/L2 destination id or upper layer link id), pre-configuration had information indicating SL DRX operation is applied in the figure. The UE calculates starting subframe and slot for the first SL DRX on-duration timer. In this calculation, the UE's group id (e.g., L1/L2 destination id or upper layer link id) is used to calculate starting subframe and slot in order to distribute different group members in the different timing, which can avoid resource collision/congestions cross different groups. One example of calculation is as follow.

In one example, a starting subframe is an incoming subframe which meets {[(SFN*10)+subframe number] modulo (SL DRX cycle)=(L1/L2 destination id) modulo (SL DRX cycle)}. In another example, a starting subframe is an incoming subframe which meets {[(SFN*10)+subframe number] modulo (SL DRX cycle)=(L1/L2 destination id) modulo (N)}.

In another example, a starting slot is a slot after {(L1/L2 destination id) modulo M} from the starting subframe determined in the above.

It is noted that, instead of L1/L2 destination id, an upper layer link/application id or any kind of id that can distinguish the groupcast/broadcast group can be used in the above calculation. It is noted that it is also possible starting subframe is only calculated by using L1/L2 destination id in modulo equation but starting slot is fixed without the above example calculation (e.g., starting slot can be fixed as the first slot in the starting subframe).

The UE can also calculate the actual SL DRX on-duration timer length and/or SL DRX inactivity timer length for the given group, which indicated by L1/L2 destination id or upper layer link id, if the UE knows the number of group members. For example: an SL DRX on-duration timer is {(number of group members)*SF #1}; and/or an SL DRX inactivity timer is {(Number of group members)*SF #2}. In another example, an SL DRX on-duration timer is {(received SL DRX on-duration timer length)*(SF #1 that corresponds to the number of group members)}; and/or SL DRX inactivity timer is {(received SL DRX inactivity timer length)*(SF #2 that corresponds to the number of group member)}

If the UE doesn't know the number of group members, default SL DRX on-duration timer length and SL DRX inactivity timer length are used. It is noted that this embodiment also includes the possibility that default SL DRX on-duration timer length and SL DRX inactivity timer length can be commonly used regardless of whether the UE knows the number of group members or not. Also, it is noted in the figure, it is assumed that separate SF values can be signaled for SL DRX on-duration timer and SL DRX inactivity timer, however single common SF can be also used instead of two separate SFs.

As illustrated in FIG. 9, T631 and T641 indicate the calculated starting subframe and slot timing and SL DRX on-duration timer starts from T631 in the RX UEs and from T641 in the TX UE #1 and TX UE #2. It is noted that T631 and T641 are most likely same timing. From the TX UEs' point of view, the TX UE #1 and the TX UE #2 need to start resource (re)selection in advance before actual PSCCH and/or PSSCH transmissions. Resource (re)selection may be performed based on the channel sensing (including partial sensing) or random selection. Details of resource (re)selection procedure is specified in 3GPP standard specification (e.g., physical layer procedure for control and physical layer procedure for data).

It may be assumed that the TX UE #1 and the TX UE #2 perform resource (re)selection in T621 and T622. In T621 and T622, TX UE may select the resource for initial transmission (i.e., not including HARQ retransmissions) in the period from T641 to T644 (i.e., while SL DRX on-duration timer runs) or in the period from T632 to T635 (i.e., while SL DRX inactivity timer runs) if the SL inactivity timer runs. In order to guarantee the TX UE to select the resource for transmission during the time period where SL DRX on-duration/inactivity timer runs in the peer RX UE(s), the TX UE needs to consider resource selection window also starts when SL DRX on-duration timer starts.

For example, referring FIG. 8, the TX UE may consider time (n+T1) for the start of resource selection window is equal to the time when SL DRX on-duration timer starts (e.g., T641 and T646 in the FIG. 6) and perform SL channel sensing in advance than the time when SL DRX on-duration timer starts (e.g., T641 and T646 in the FIG. 6). In this case, the sensing window's location in time-domain is decided based on the assumption resource selection window is started at the time when SL DRX on-duration timer starts. With the same principle, time (n+T2) for the end of resource selection window is equal to the time when SL DRX inactivity timer expires and none of SL DRX timers (e.g., SL DRX HARQ retransmission timer, etc.), which defines the time duration where the RX UE(s) needs to monitor PSCCH and/or PSSCH, runs.

In FIG. 9, it is assumed that the TX UE #1 transmits PSCCH and PSSCH for initial transmission in T642 and the TX UE #2 transmits PSCCH and PSSCH for initial transmission in T643 while SL DRX on-duration timer runs. The RX UEs starts or restarts (if the timer was already started and the timer is running) SL DRX inactivity timer whenever the RX UE receives PSCCH and/or PSSCH for initial transmission for the mapped or interested groupcast/broadcast group id (e.g., the mapped or interested L1/L2 destination id or upper layer link id), which described in T632 and T633.

In FIG. 9, the restarted SL DRX inactivity timer from T633 expires in T635 since there was no further PSCCH and/or PSSCH for initial transmission from any TX UE. In the TX UE sides, the SL DRX inactivity timer is maintained in the similar way as RX UEs. For example, the TX UE #1 starts the SL DRX inactivity timer in T642 when the TX UE #1 transmits its own PSCCH and/or PSSCH for initial transmission to RX UEs and once transmission is done in T642, this UE turns into the RX UE considering there is no further data to be transmitted which means this UE may receive PSCCH and/or PSSCH for initial transmission from the TX UE #1 in T633 as the RX UE.

Then the UE restarts SL DRX inactivity timer in T643 and SL DRX inactivity timer expires in T645. For other example, the TX UE #2 starts SL DRX inactivity timer in T632 as the RX UE because the TX UE #2 does not perform transmission at that time so the RX UE receives PSCCH and/or PSSCH for initial transmission from the TX UE #1 in T632. And when the TX UE #1 transmits its own PSCCH and/or PSSCH for initial transmission to the RX UEs in T643, the TX UE #1 restarts SL DRX inactivity timer (because the timer was already started and is running) in T643 and SL DRX inactivity timer expires in T645.

With this kind of specified rules, the RX UE(s) and the TX UE(s) are synchronized regarding the start timing of SL DRX inactivity timer and expiry timing of SL DRX inactivity timer. It is noted that the SL DRX on-duration timer is also maintained in the TX UE as the similar way as the RX UE, so the actual starting subframe and slot for SL DRX on-duration timer (T631 in the RX UE and T641 in the TX UE) and expiry timing for the SL DRX on-duration timer (T634 in RX UE and T644 in TX UE) are synchronized between the TX UE(s) and the RX UE(s).

In a DRX operation for the given interested/mapped L1/L2 destination id, the RX UE(s) monitors PSCCH and/or PSSCH for the initial transmission (not for HARQ retransmissions) while either SL DRX on-duration timer and SL DRX inactivity timer runs (from T631 to T635). Otherwise for the given interested/mapped L1/L2 destination id, the RX UE(s) skips monitoring PSCCH and/or PSSCH for the initial transmission unless other DRX active time (other than SL DRX on-duration timer and SL DRX inactivity timer, e.g., time duration where a SL DRX HARQ retransmission timer runs) specified in 3GPP standard specification (e.g., MAC) is met. After T635, the RX UE(s) starts next SL DRX on-duration timer in T636 after SL DRX cycle length from T631. In the same manner, the TX UE(s) starts next SL DRX on-duration timer in T646. SL DRX cycle length can be derived with the following examples.

In one example, a default SL DRX cycle length in T601, T602 and T603 is used.

In another example, a default SL DRX cycle length in T601, T602 and T603 is initially used but SL DRX cycle length can be updated based on the minimum value of {time elapsed for PSCCH and/or PSSCH reception from the starting time of SL DRX on-duration timer and the resource reservation period in SCI in PSCCH and/or PSSCH} if the SL DRX cycle length is shorter or longer than the default SL DRX cycle length. For example, it may be assumed that a default SL DRX cycle is 320 ms in T603, resource reservation period information #1 included in SCI in PSCCH and/or PSSCH in T632 indicates 70 ms and (T632−T631) is 10 ms, and resource reservation period information #2 included in SCI in PSCCH and/or PSSCH in T633 indicates 140 ms and (T633−T631) is 20 ms. 80 ms is derived from minimum of {(70+10) ms, (140+20) ms} and since 80 ms is shorter than the default SL DRX cycle length (320 ms), 80 ms is decided as SL DRX cycle length.

It is noted that, for functional concept/definition of SL DRX on-duration timer, an SL DRX inactivity timer, SL DRX cycle, and SL DRX HARQ retransmission timer, drx-onDurationTimer, drx-InactivityTimer, DRX cycle, and drx-RetransmissionTimerDL defined for downlink in 3GPP standard specification are referred. (e.g., MAC).

Figure 10A:
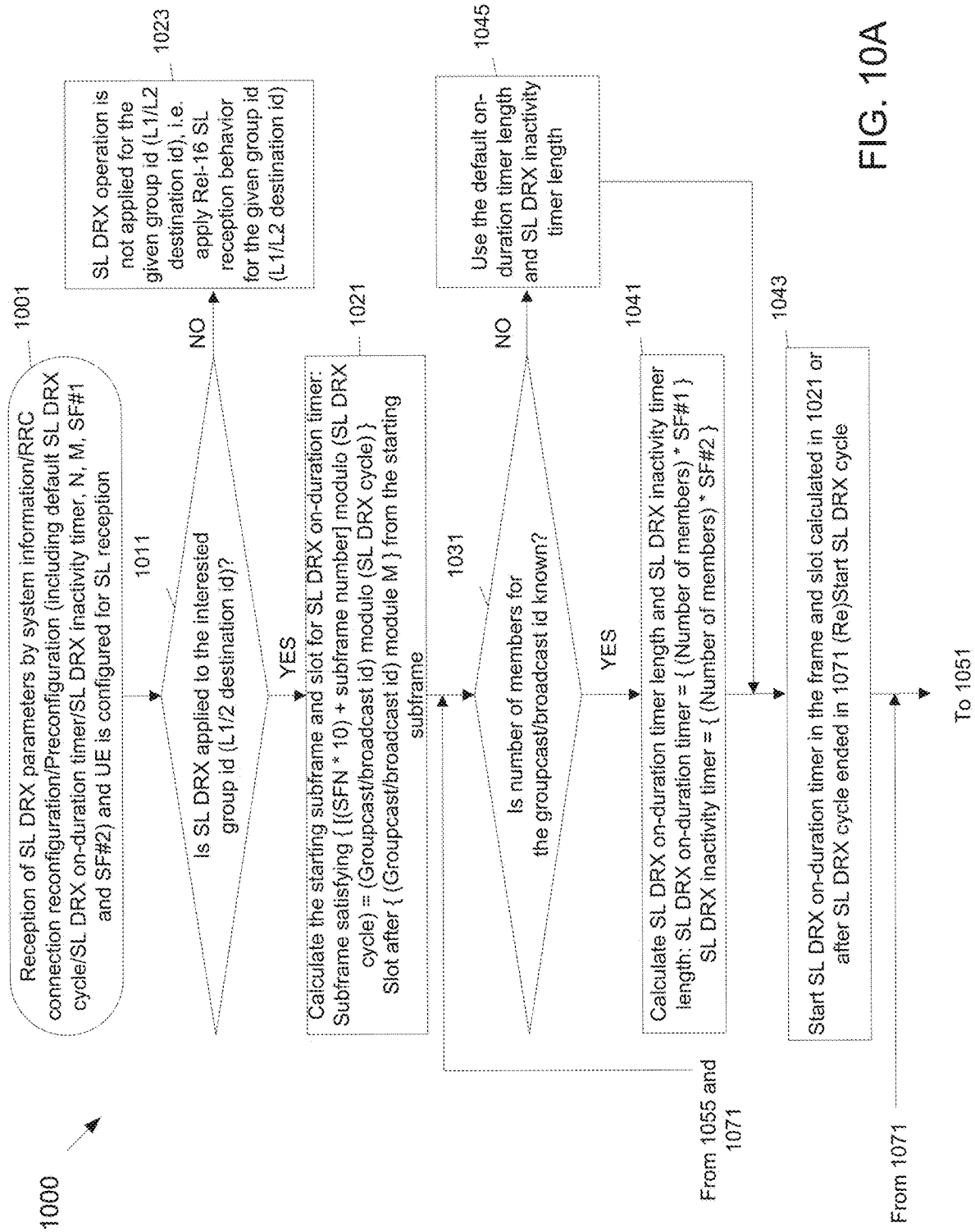
FIG. 10A illustrates a flowchart of a method for RX UE behaviors according to embodiments of the present disclosure.

FIG. 10A illustrates a flowchart of a method 1000 for RX UE behaviors according to embodiments of the present disclosure. An embodiment of the method 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions.

Figure 10B:
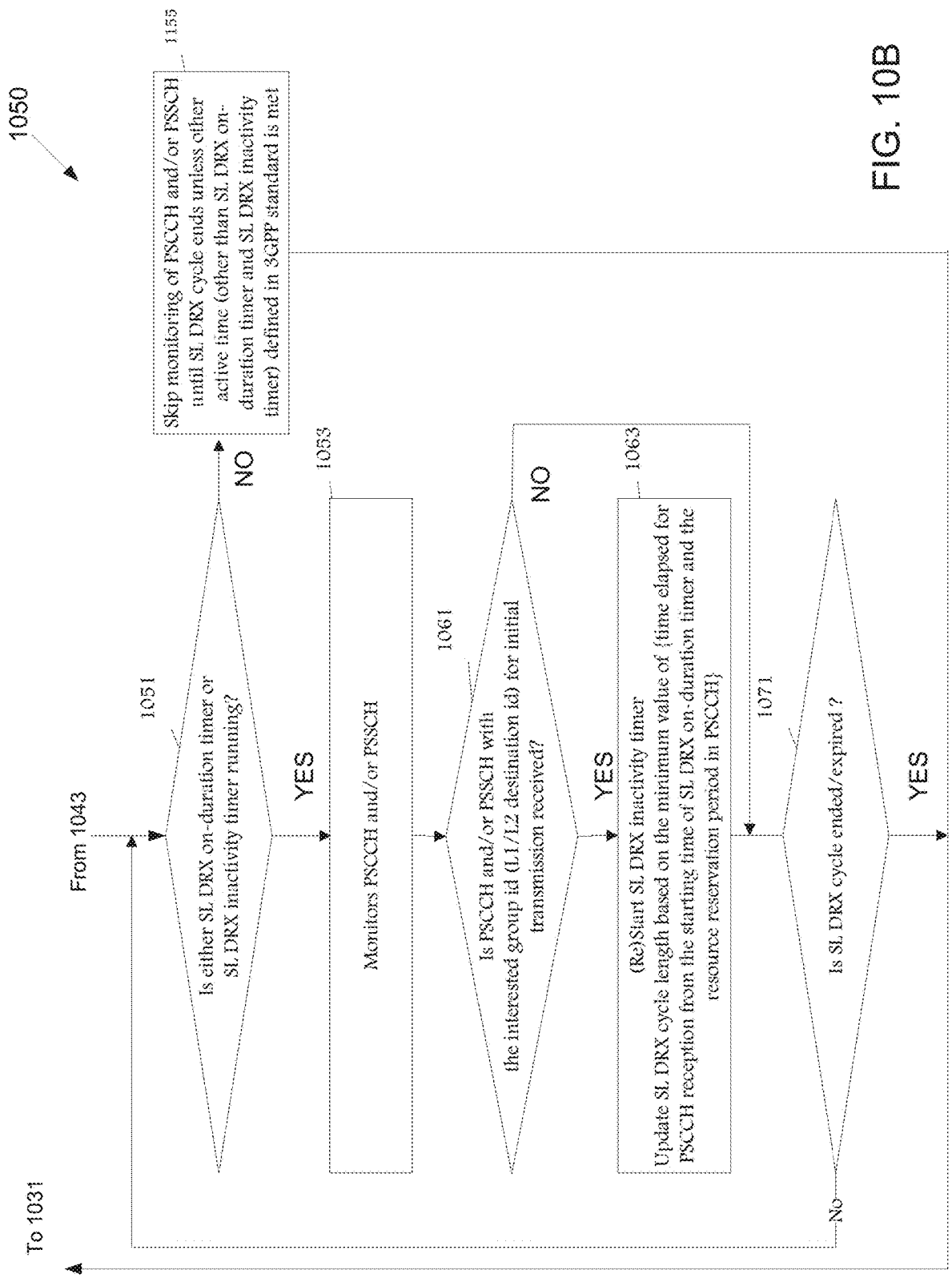
FIG. 10B illustrates a flowchart of a method for RX UE behaviors according to embodiments of the present disclosure.

FIG. 10B illustrates a flowchart of a method 1050 for RX UE behaviors according to embodiments of the present disclosure. An embodiment of the method 1050 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions.

As illustrated in FIGS. 10A and 10B, a UE receives SL DRX related parameters/configurations by system information, an RRC dedicated message (e.g., RRC connection reconfiguration) or pre-configuration and the UE is configured for SL reception by the upper layer in step 1001. The SL DRX related parameters/configurations includes default SL DRX cycle length, default SL DRX on-duration timer length, default SL DRX inactivity timer length, N, M, SF #1 and SF #2. In another example, list of SF #1 and/or SF #2 can be included and each SF #1 and/or SF #2 can be linked with the number of group member UEs, e.g., the first SF #1 is used when the number of group member UEs are (equal or) less than Threshold #1, the second SF #1 is used when the number of group member UEs are more than Threshold #1 but (equal or) less than Threshold #2, and so forth. For the given L1/L2 destination id or upper layer link/application id, which the UE is interested on the SL reception, the UE determines if the SL DRX operation is applied or not in step 1011.

It is noted that an L2 destination id for the corresponding SL groupcast/broadcast is provided by the upper layer and the L2 destination id is received as part of MAC header in PSSCH and L1 destination id is provided by a MAC layer to a physical layer and the L1 destination id is received as part of SCI in PSCCH and/or PSSCH. Pre-configuration includes the information indicating whether SL DRX is applied or not for a given L2 destination id or upper layer/application id. Based on the pre-configuration, if an SL DRX operation is applied to the given interested L1/L2 destination id or upper layer link/application id, the UE calculates the starting subframe and slot for SL DRX on-duration timer in step 1021.

A starting subframe is an incoming subframe satisfying $\{[(SFN*10)+\text{subframe number}] \text{ modulo (SL DRX cycle)} = (\text{groupcast/broadcast id}) \text{ modulo (SL DRX cycle)}\}$. In another example, a starting subframe is an incoming subframe which meets $\{[(SFN*10)+\text{subframe number}] \text{ modulo (SL DRX cycle)} = (L1/L2 \text{ destination id}) \text{ modulo (N)}\}$. A starting slot is a slot after $\{(\text{Groupcast/broadcast id}) \text{ module M}\}$ from the starting subframe. It is noted that it is also possible the UE only calculates starting subframe by using L1/L2 destination id in the modulo equation (like the above equation) and the starting slot is fixed without calculation. For example, the starting slot can be fixed as the first slot in the starting subframe. Based on the pre-configuration, if the SL DRX operation is not applied to the given interested L1/L2 destination id or upper layer link/application id, the UE does not apply SL DRX operation in SL reception for the L1/L2 destination id (i.e., applying Rel-16 SL reception behavior for the L1/L2 destination id) in step 1023.

If the UE knows participated number of members belonging to the L1/L2 destination id in step 1031, the UE calculates SL DRX on-duration timer length and SL DRX inactivity timer length in step 1041. For example, an SL DRX on-duration timer is {(Number of group members)*SF #1} and an SL DRX inactivity timer is {(Number of group members)*SF #2}. In another example, an SL DRX on-duration timer is {(received SL DRX on-duration timer length)*(SF #1 that corresponds to the number of group members)}; and/or SL DRX inactivity timer is {(received SL DRX inactivity timer length)*(SF #2 that corresponds to the number of group member)}. If the UE does not know the number of participated group members, default SL DRX on-duration timer length and SL DRX inactivity timer length are used in step 1045.

It is noted that this embodiment also includes the possibility that default SL DRX on-duration timer length and SL DRX inactivity timer length can be commonly used regardless of whether the UE knows the number of group members or not. Also, it is noted in FIGS. 10A and 10B, it is assumed separate SF values can be signaled for the SL DRX on-duration timer and the SL DRX inactivity timer, however single common SF can be also used instead of two separate SF s.

In step 1043, the UE starts SL DRX on-duration timer in the frame and slot calculated in step 1021 or after SL DRX cycle ended in step 1071, and (re)starts SL DRX cycle at the start of SL DRX on-duration timer. If either SL DRX on-duration timer or SL DRX inactivity timer is running in step 1051, the UE monitors PSCCH and/or PSSCH for the L1/L2 destination id in step 1053. If neither SL DRX on-duration timer nor SL DRX inactivity timer is running in step 1051, the UE skips monitoring of PSCCH and/or PSSCH until SL DRX cycle ends/expires unless other active time (other than SL DRX on-duration timer and SL DRX inactivity timer, e.g., time duration where a SL DRX HARQ retransmission timer runs) specified in 3GPP standard specification is met (in step 1055).

If the UE receives PSCCH and/or PSSCH with the L1/L2 destination id for initial transmission (not for HARQ retransmission) in step 1061, the UE (re)starts SL DRX inactivity timer (restarts if SL DRX inactivity timer was already started and the timer is running) in step 1063. The UE can also update SL DRX cycle length based on the minimum value of {time elapsed for PSCCH and/or PSSCH reception from the starting time of SL DRX on-duration timer and the resource reservation period in SCI in PSCCH and/or PSSCH} if the SL DRX cycle length is shorter or longer than the default SL DRX cycle length (in step 1063). If the SL DRX cycle length is equal to the default DRX cycle length or no SCI in PSCCH and/or PSSCH with the resource reservation period is received for the L1/L2 destination id, the UE uses default SL DRX cycle length.

As another example, regardless of PSCCH and/or PSSCH reception time and resource reservation period in SCI in PSCCH and/or PSSCH, the UE can use default SL DRX cycle length. In the case, system information/RRC dedicated message (e.g., RRC connection reconfiguration)/pre-configuration may include multiple default SL DRX cycles according to the QoS level and in the case the UE can select the most appropriate default SL DRX cycle according to the required QoS level for the SL communication with the L1/L2 destination id. If the SL DRX cycle ends/expires in step 1071, the UE goes to the step 1031. If the SL DRX cycle does not end or expire, the UE goes to the step 1051. In step 1061 if the UE does not receive PSCCH and/or PSSCH with the L1/L2 destination id for initial transmission, the UE goes to the step 1071.

Figure 11A:
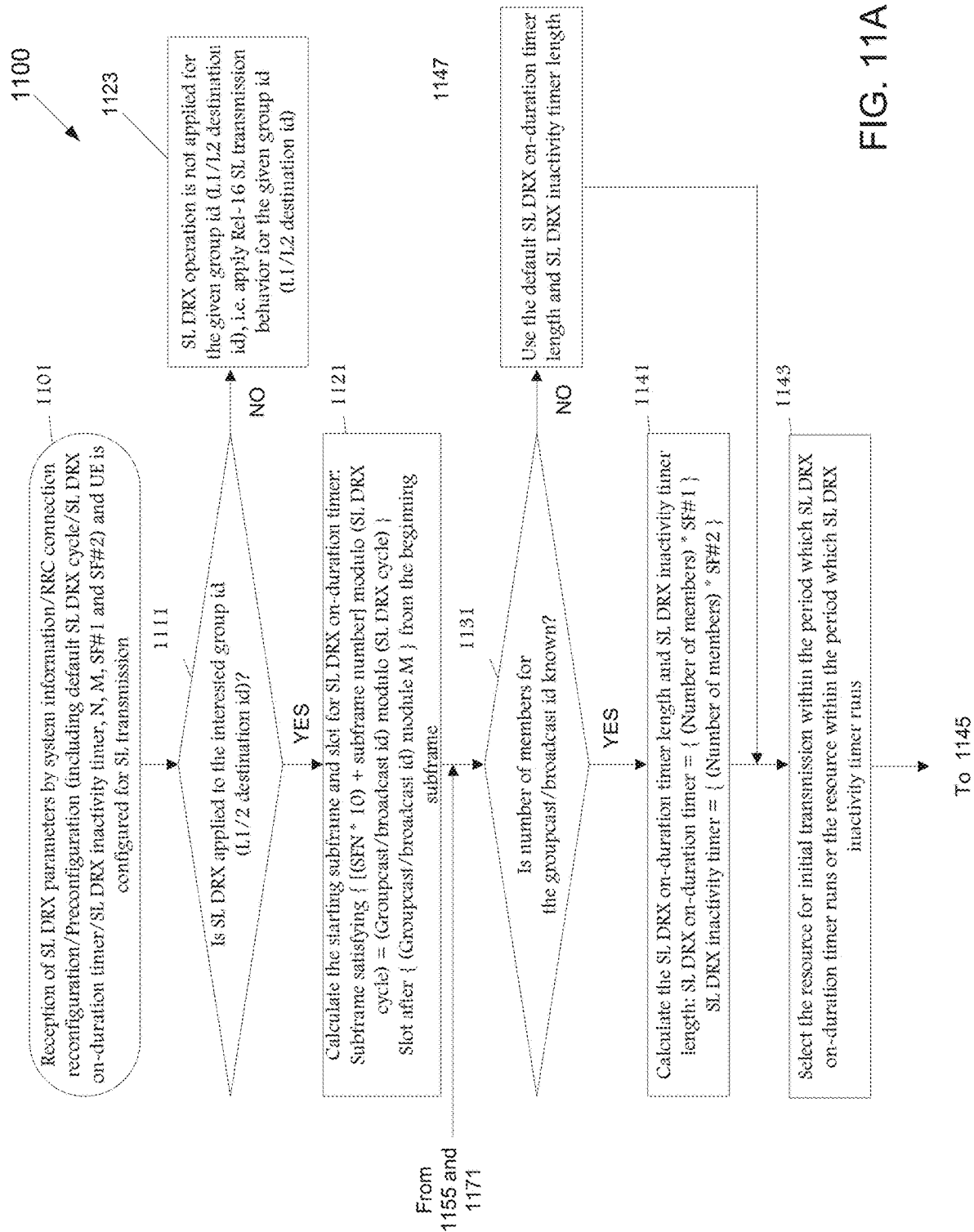
FIG. 11A illustrates a flowchart of a method for TX UE behaviors according to embodiments of the present disclosure.

FIG. 11A illustrates a flowchart of a method 1100 for TX UE behaviors according to embodiments of the present disclosure. An embodiment of the method 1100 shown in FIG. 11A is for illustration only. One or more of the components illustrated in FIG. 11A can be implemented in specialized circuitry configured to perform the noted functions or one or more of the components can be implemented by one or more processors executing instructions to perform the noted functions.

FIG. 11B illustrates a flowchart of a method 1150 for TX UE behaviors according to embodiments of the present disclosure. An embodiment of the method 11500 shown in FIG. 11B is for illustration only. One or more of the components illustrated in FIG. 11B can be implemented in specialized circuitry configured to perform the noted functions or one or more of the components can be implemented by one or more processors executing instructions to perform the noted functions.

As illustrated in FIGS. 11A and 11B, a UE receives SL DRX related parameters/configurations by system information, RRC dedicated message (e.g., RRC connection reconfiguration) or pre-configuration and the UE is configured for SL transmission by the upper layer in step 1101. SL DRX related parameters/configurations includes default SL DRX cycle length, default SL DRX on-duration timer length, default SL DRX inactivity timer length, N, M, SF #1 and SF #2. In another example, list of SF #1 and/or SF #2 can be included and each SF #1 and/or SF #2 can be linked with the number of group member UEs, e.g., the first SF #1 is used when the number of group member UEs are (equal or) less than Threshold #1, the second SF #1 is used when the number of group member UEs are more than Threshold #1 but (equal or) less than Threshold #2, and so forth.

For the given L1/L2 destination id or upper layer link/application id, which the UE is interested on SL transmission, the UE determines if a DRX operation is applied or not in step 1111.

It is noted that an L2 destination id for the corresponding SL groupcast/broadcast is provided by the upper layer and the L2 destination id is transmitted/received as part of MAC header in PSSCH and L1 destination id is provided by a MAC layer to a physical layer and the L1 destination id is transmitted/received as part of SCI in PSCCH and/or PSSCH. Pre-configuration includes the information indicating whether SL DRX is applied or not for a given L2 destination id or upper layer/application id.

Based on the pre-configuration, if the SL DRX operation is applied to the given interested L1/L2 destination id or upper layer link/application id, the UE calculates the starting subframe and slot for SL DRX on-duration timer in step 1121. A starting subframe is an incoming subframe satisfying {[(SFN*10)+subframe number] modulo (SL DRX cycle)=(groupcast/broadcast id) modulo (SL DRX cycle)}. In another example, a starting subframe is an incoming subframe which meets {[(SFN*10)+subframe number] modulo (SL DRX cycle)=(L1/L2 destination id) modulo (N)}. A starting slot is a slot after {(Groupcast/broadcast id) module M} from the starting subframe.

It is noted that it is also possible the UE only calculates starting subframe by using L1/L2 destination id in the modulo equation (like the above equation) and the starting slot is fixed without calculation. For example, the starting slot can be fixed as the first slot in the starting subframe. Based on the pre-configuration, if the SL DRX operation is not applied to the SL communication with the given interested L1/L2 destination id or upper layer link/application id, the UE does not apply SL DRX operation in SL transmission for the L1/L2 destination id (i.e., applying Rel-16 SL transmission behavior for the L1/L2 destination id) in step 1123.

If the UE knows participated number of members belonging to the L1/L2 destination id in step 1131, the UE calculates SL DRX on-duration timer length and SL DRX inactivity timer length in step 1141. For example, SL DRX on-duration timer is {(Number of group members)*SF #1} and SL DRX inactivity timer is {(Number of group members)*SF #2}. In another example, an SL DRX on-duration timer is {(received SL DRX on-duration timer length)*(SF #1 that corresponds to the number of group members)}; and/or SL DRX inactivity timer is {(received SL DRX inactivity timer length)*(SF #2 that corresponds to the number of group member)}. If the UE does not know the number of participated group members, default SL DRX on-duration timer length and SL DRX inactivity timer length are used in step 1147.

It is noted that this embodiment also includes the possibility that default SL DRX on-duration timer length and SL DRX inactivity timer length can be commonly used regardless of whether the UE knows the number of group members or not. Also, it is noted in the figure, it is assumed that separate SF values can be signaled for SL DRX on-duration timer and SL DRX inactivity timer, however single common SF can be also used instead of two separate SFs. The UE performs resource selection in advance before PSCCH and/or PSSCH transmission in step 1143.

For resource for initial transmission (not for HARQ retransmission), the UE selects the resource within the period which SL DRX on-duration timer runs or SL DRX inactivity timer runs. It is noted that resource selection is done based on channel sensing (including partial sensing) performed during the prior window or random selection, which are specified in 3GPP standard specifications.

In step 1145, the UE starts SL DRX on-duration timer in the frame and slot calculated in step 1121 or after DRX cycle ended/expired in step 1171, and (re)starts SL DRX cycle at the start of SL DRX on-duration timer. If either SL DRX on-duration timer or SL DRX inactivity timer is running in step 1151, the UE monitors PSCCH and/or PSSCH for the L1/L2 destination id, transmits PSCCH and/or PSSCH when the selected resource in step 1143 is available, and performs another resource selection and PSCCH and/or PSSCH transmission if needed (e.g., if UE has more new data in the transmission buffer to be sent) in step 1153.

The UE may select the resource for initial transmission within the period which SL on-duration timer or SL inactivity timer runs. If neither SL on-duration timer nor SL inactivity timer is running in step 1151, the UE does not perform resource selection and not transmit neither PSCCH nor PSSCH for initial transmission until DRX cycle ends/expires unless other active time (other than SL DRX on-duration timer and SL DRX inactivity timer, e.g., time duration where a SL DRX HARQ retransmission timer runs) specified in 3GPP standard specification is met (in step 1155). If the UE transmits or receives PSCCH and/or PSSCH with the L1/L2 destination id for initial transmission (not for HARQ retransmission) in step 1161, the UE (re)starts SL DRX inactivity timer (restarts if SL DRX inactivity timer was already started and the timer is running) and the UE can also update SL DRX cycle length based on the minimum value of {time elapsed for PSCCH and/or PSSCH transmission/reception from the starting time of SL DRX on-duration timer and the resource reservation period in SCI in PSCCH and/or PSSCH} if the SL DRX cycle length is shorter or longer than the default SL DRX cycle length (in step 1163).

If the SL DRX cycle length is equal to the default SL DRX cycle length or no SCI in PSCCH and/or PSSCH with the resource reservation period is received for the L1/L2 destination id, the UE uses default SL DRX cycle length. As another example, regardless of PSCCH and/or PSSCH reception time and resource reservation period in PSCCH, the UE can use default SL DRX cycle length. In the case, system information/RRC dedicated message (e.g., RRC connection reconfiguration)/pre-configuration may include multiple default SL DRX cycles according to the QoS level and in the case the UE can select the most appropriate default SL DRX cycle according to the required QoS level for the L1/L2 destination id.

It is noted that in steps 1161 and 1163, the difference compared to RX UE behavior is that the TX UE includes not only the received PSCCH and/or PSSCH but also its own transmitted PSCCH and/or PSSCH, e.g., SL DRX inactivity timer is also (re)started when the TX UE transmits PSCCH and/or PSSCH for initial transmission and time elapsed for its own PSCCH transmission and resource reservation period in the SCI in PSCCH and/or PSSCH is also considered in the update of SL DRX cycle length.

If SL DRX cycle ends/expires in step 1171, the UE goes to step 1131. If the SL DRX cycle does not end or expire, the UE goes to step 1151. In step 1161 if the UE does not receive PSCCH and/or PSSCH with the L1/L2 destination id for initial transmission, the UE goes to step 1171. As illustrated in FIGS. 11A and 11B, it may be assumed that the TX UE also maintains the same timers as SL DRX on-duration timer and SL DRX inactivity timer in the RX UE side, however it is also possible that the TX UE maintains new timers (with the different names) that operates in the same or similar manner as SL DRX on-duration timer and SL DRX inactivity timer as illustrated in FIGS. 11A and 11B.

As described in aforementioned embodiments and/or example, it is assumed that RX UE's DRX and/or TX UE's corresponding DTX operates per SL link(s) for a given source id (L1/L2 source TX UE id), or destination id (L1/L2 destination RX UE/Group id), or combination of source id and destination id, or a combination of SL logical channel id, source id and destination id.

It means different DRX may operate for SL link(s) if source id (L1/L2 source id), or destination id (L1/L2 destination id) or combination of source id and destination id, or a combination of SL logical channel id, source id and destination id is not same.

In another example, the RX UE's DRX and/or TX UE's corresponding DTX can operates in different manner dependent on the SL cast type. For instance, if SL link is SL unicast, RX UE's DRX and/or TX UE's corresponding DTX operates per SL link(s) for a given source id while if SL link is SL groupcast or broadcast, RX UE's DRX and/or TX UE's corresponding DTX operates per SL link(s) for a given destination id. This is because in general, the DRX operation has quite relation to the traffic pattern generated in the TX UE so it makes sense that DRX operates per source TX UE. This principle is well applied to SL unicast, however for SL groupcast/broadcast considering many UEs can be TX UEs (e.g., group members) if this principle is maintained for SL groupcast/broadcast, it may bring more UE power consumption issue due to many independent active times.

Since all member UEs share same application and most likely similar traffic pattern (or QoS level) in the groupcast/broadcast with the same destination id, it would be more desirable that the DRX operates per destination id in SL groupcast/broadcast. It is noted that the DRX in the RX UE (and/or corresponding DTX in TX UE) operates per SL link(s) with a given source id if SL link is SL uncast and DRX (and/or DTX) operates per SL link(s) with a given destination id if SL link is SL groupcast/broadcast, any other combination is also possible in this embodiment.

Figure 12:
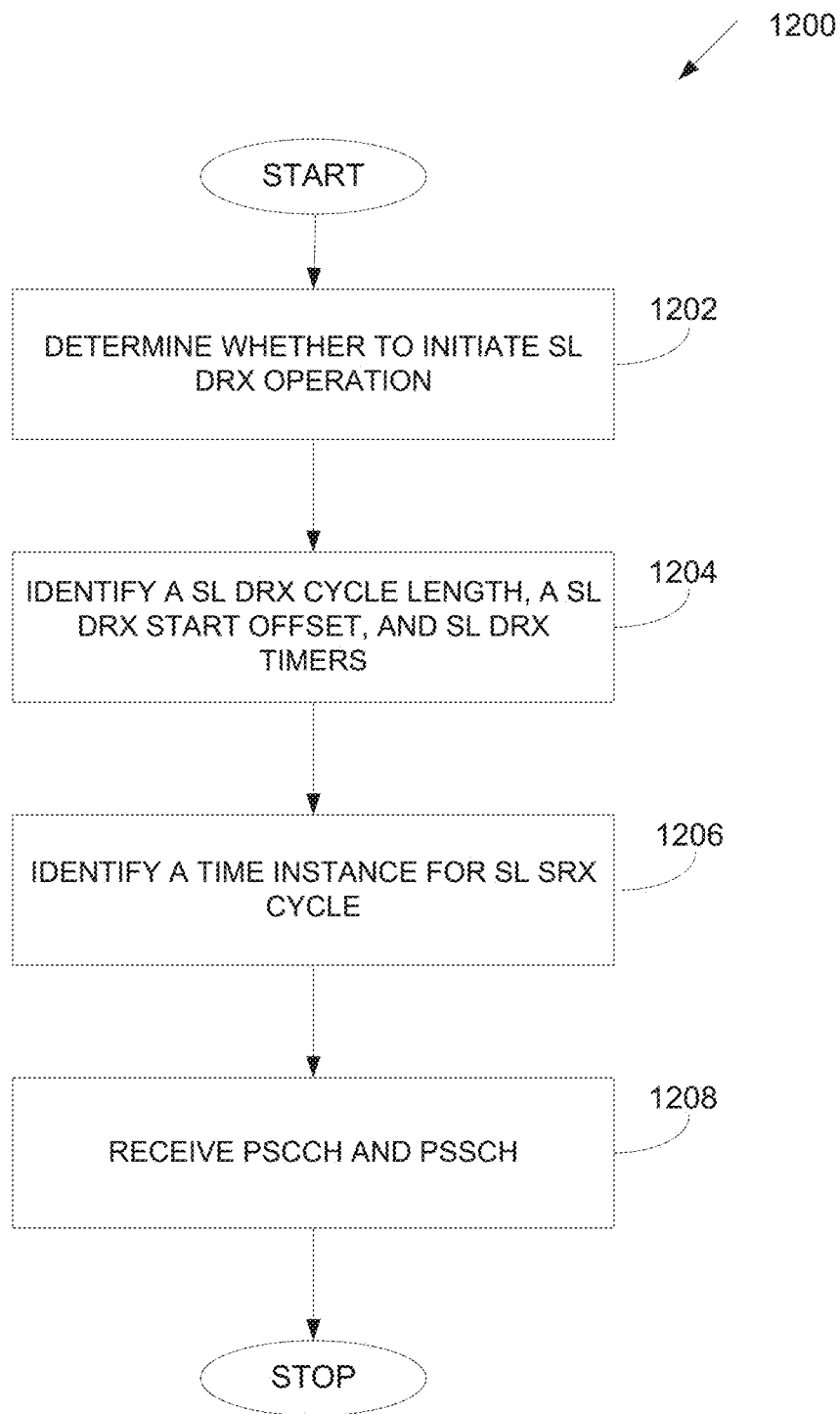
FIG. 12 illustrates a flow chart of a method for a discontinuous reception for a sidelink groupcast/broadcast operation according to embodiments of the present disclosure.

FIG. 12 illustrates a flowchart of a method 1200 for a discontinuous reception for a sidelink groupcast/broadcast operation according to embodiments of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1202. In step 1202, the first UE determines whether to initiate a SL DRX operation for a SL groupcast/broadcast operation.

In step 1204, the first UE identifies at least one of a SL DRX cycle length, a SL DRX start offset, and SL DRX timers for the SL groupcast/broadcast operation.

In step 1206, the first UE identifies, based on at least one of a destination ID and the SL DRX start offset, a time instance in which a SL DRX cycle starts. In step 1206, the time instance comprises at least one of a slot, a subframe, and a frame.

In step 1208, the first UE receives, from a second UE belongs to the destination ID, a PSCCH and a PSSCH based on the at least one of the SL DRX cycle length, the SL DRX start offset, the destination ID, and the SL DRX timers.

In one embodiment, the first UE identifies an indicator that is configured per L2 destination identification ID included in pre-configuration information for a SL communication, the indicator indicating whether to initiate the SL DRX operation for the SL groupcast/broadcast operation.

In one embodiment, the first UE identifies the at least one of the SL DRX cycle length, the SL DRX start offset, and the SL DRX timers for the SL groupcast/broadcast operation based on pre-configuration information.

In one embodiment, the first UE further identifies the at least one of the SL DRX cycle length, the SL DRX start offset, and the SL DRX timers for the SL groupcast/broadcast operation based on at least one of a SIB or a dedicated RRC signaling.

In one embodiment, the first UE determines whether a default value is applied for the at least one of the SL DRX cycle length, the SL DRX start offset, and the SL DRX timers, respectively, based on characteristics of data transmissions, applies the default value for the at least one of the SL DRX cycle length, the SL DRX start offset, and the SL DRX timers, respectively, based on a determination that the default value is applied; and applies a first value for the at least one of the SL DRX cycle length, the SL DRX start offset, and the SL DRX timers, respectively, based on a determination that the default value is not applied, the default value and the first value are different values from each other.

In one embodiment, the first UE determines whether a number of group member UEs is identified by an upper layer of the first UE and adjusts at least one of values of the SL DRX timers using a number of scaling factors based on the number of group member UEs. In such embodiment, the SL DRX timer is at least one of a SL DRX on-duration timer and a SL DRX inactivity timer. In such embodiment, the number of scaling factors corresponding to the number of group member UEs is configured based on at least one of pre-configuration information, a SIB, a dedicated RRC signaling, or pre-determined values.

In one embodiment, the first UE receives SCI or a MAC CE including an indicator indicating whether the SL DRX operation is applied for the SL groupcast/broadcast operation with the destination ID.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first user equipment (UE) comprising:
a processor configured to:
identify a layer 2 (L2) destination identification (ID),
determine whether to initiate a sidelink discontinuous (SL DRX) operation for a SL groupcast/broadcast operation, and determine a SL DRX start offset based on the L2 destination ID; and a transceiver operably coupled to the processor, the transceiver configured to receive, from a second UE that belongs to the L2 destination ID, a physical sidelink control channel (PSCCH) and a physical sidelink shared channel (PSSCH) based the SL DRX start offset.

2. The first UE of claim 1, wherein the processor is further configured to determine whether to initiate the SL DRX operation for the SL groupcast/broadcast operation based on the L2 destination ID and information included in pre-configuration information.

3. The first UE of claim 1, wherein the processor is further configured to:
identify the SL DRX start offset for the SL groupcast/broadcast operation based on pre-configuration information; or
identify the SL DRX start offset for the SL groupcast/broadcast operation based on at least one of a system information block (SIB) or a dedicated radio resource control (RRC) signaling.

4. The first UE of claim 1, wherein the processor is further configured to:
determine whether a default value is applied for the SL DRX start offset based on characteristics of data transmissions;
apply the default value for the SL DRX start offset based on a determination that the default value is applied; and
apply a first value for the SL DRX start offset based on a determination that the default value is not applied, the default value and the first value are different values from each other.

5. The first UE of claim 1, wherein:
the processor is further configured to:
determine SL DRX timers for the SL groupcast/broadcast operation, wherein the SL DRX timers comprise values, respectively, and wherein the SL DRX timers are at least one of SL DRX on-duration timers and SL DRX inactivity timers,
determine whether a number of group member UEs is identified by an upper layer of the first UE, and
adjust at least one of the values of the SL DRX timers using a number of scaling factors based on the number of group member Ues.

6. The first UE of claim 5, wherein the number of scaling factors corresponding to the number of group member Ues is configured based on at least one of pre-configuration information, a system information block (SIB), a dedicated radio resource control (RRC) signaling, or pre-determined values.

7. The first UE of claim 1, wherein the transceiver is further configured to receive sidelink control information (SCI) or a MAC control element (CE) including an indicator indicating whether the SL DRX operation is applied for the SL groupcast/broadcast operation with the L2 destination ID.

8. A method of a first user equipment (UE), the method comprising:
identifying a layer 2 (L2) destination identification (ID);
determining whether to initiate a sidelink discontinuous (SL DRX) operation for a SL groupcast/broadcast operation;
determining a SL DRX start offset based on the L2 destination ID; and
receiving, from a second UE that belongs to the L2 destination ID, a physical sidelink control channel (PSCCH) and a physical sidelink shared channel (PSSCH) based on the SL DRX start offset.

9. The method of claim 8, further comprising determining whether to initiate the SL DRX operation for the SL groupcast/broadcast operation based on the L2 destination ID and information included in pre-configuration information.

10. The method of claim 8, further comprising:
identifying the SL DRX start offset for the SL groupcast/broadcast operation based on pre-configuration information; or
identifying the SL DRX start offset for the SL groupcast/broadcast operation based on at least one of a system information block (SIB) or a dedicated radio resource control (RRC) signaling.

11. The method of claim 8, further comprising:
determining whether a default value is applied the SL DRX start offset based on characteristics of data transmissions;
applying the default value for the SL DRX start offset based on a determination that the default value is applied; and
applying a first value for the SL DRX start offset based on a determination that the default value is not applied, the default value and the first value are different values from each other.

12. The method of claim 8, further comprising:
determining SL DRX timers for the SL groupcast/broadcast operation, wherein the SL DRX timers comprise values, respectively, and wherein the SL DRX timers are at least one of SL DRX on-duration timers and SL DRX inactivity timers,
determining whether a number of group member UEs is identified by an upper layer of the first UE; and
adjusting at least one of the values of the SL DRX timers using a number of scaling factors based on the number of group member UEs.

13. The method of claim 12, wherein the number of scaling factors corresponding to the number of group member UEs is configured based on at least one of pre-configuration information, a system information block (SIB), a dedicated radio resource control (RRC) signaling, or pre-determined values.

14. The method of claim 8, further comprising receiving sidelink control information (SCI) or a MAC control element (CE) including an indicator indicating whether the SL DRX operation is applied for the SL groupcast/broadcast operation with the L2 destination ID.

15. A second user equipment (UE) comprising:
a processor configured to:
identify a layer 2 (L2) destination identification (ID),
determine whether to initiate a sidelink discontinuous (SL DRX) operation for a SL groupcast/broadcast operation, and
determine a SL DRX start offset based on the L2 destination ID; and
a transceiver operably coupled to the processor, the transceiver configured to transmit, to a first UE that belongs to the L2 destination ID, a physical sidelink control channel (PSCCH) and a physical sidelink shared channel (PSSCH) based on the SL DRX start offset.

16. The second UE of claim 15, wherein the processor is further configured to determine whether to initiate the SL DRX operation for the SL groupcast/broadcast operation based on the L2 destination ID and information included in pre-configuration information.

17. The second UE of claim 15, wherein the processor is further configured to:

identify the SL DRX start offset for the SL groupcast/broadcast operation based on pre-configuration information; or identify the SL DRX start offset for the SL groupcast/broadcast operation based on at least one of a system information block (SIB) or a dedicated radio resource control (RRC) signaling.

18. The second UE of claim 15, wherein the processor is further configured to:

determine whether a default value is applied for the SL DRX start offset based on characteristics of data transmissions;

apply the default value for the SL DRX start offset based on a determination that the default value is applied; and apply a first value for the SL DRX start offset based on a determination that the default value is not applied, the default value and the first value are different values from each other.

19. The second UE of claim 15, wherein:

the processor is further configured to:

determine SL DRX timers for the SL groupcast/broadcast operation, wherein the SL DRX timers comprise values, respectively, and wherein the SL DRX timers are at least one of SL DRX on-duration timers and SL DRX inactivity timers, determine whether a number of group member UEs is identified by an upper layer of the first UE, and adjust at least one of the values of the SL DRX timers using a number of scaling factors based on the number of group member UEs; and the number of scaling factors corresponding to the number of group member UEs is configured based on at least one of pre-configuration information, a system information block (SIB), a dedicated radio resource control (RRC) signaling, or pre-determined values.

20. The second UE of claim 15, wherein the transceiver is further configured to transmit sidelink control information (SCI) or a MAC control element (CE) including an indicator indicating whether the SL DRX operation is applied for the SL groupcast/broadcast operation with the L2 destination ID.

* * * * *